(12) United States Patent
Buckanin et al.

(10) Patent No.: US 9,284,473 B2
(45) Date of Patent: Mar. 15, 2016

(54) ADHESIVE ARTICLE WITH RELEASE LAYER INCLUDING POLYMERIZED (METH)ACRYLATED SILICONE

(71) Applicant: 3M INNOVATIVE PROPERTIES COMPANY, St. Paul, MN (US)

(72) Inventors: Richard S. Buckanin, Woodbury, MN (US); Karan Jindal, Woodbury, MN (US); William Blake Kolb, West Lakeland, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 14/355,909

(22) PCT Filed: Dec. 13, 2012

(86) PCT No.: PCT/US2012/069409
§ 371 (c)(1),
(2) Date: May 2, 2014

(87) PCT Pub. No.: WO2013/096076
PCT Pub. Date: Jun. 27, 2013

(65) Prior Publication Data
US 2014/0302269 A1    Oct. 9, 2014

Related U.S. Application Data

(60) Provisional application No. 61/579,314, filed on Dec. 22, 2011.

(51) Int. Cl.
*B32B 3/26*    (2006.01)
*C09J 7/02*    (2006.01)
(Continued)

(52) U.S. Cl.
CPC .............. *C09J 7/0228* (2013.01); *B82Y 30/00* (2013.01); *C09D 183/04* (2013.01); *C08G 77/20* (2013.01); *C08K 3/36* (2013.01); *C08K 9/04* (2013.01); *C08K 2201/005* (2013.01);
(Continued)

(58) Field of Classification Search
CPC ........................... C09J 7/228; C09J 2433/005
See application file for complete search history.

(56) References Cited

U.S. PATENT DOCUMENTS 2,801,185 A    7/1957    Iler
RE24,906 E    12/1960    Ulrich
(Continued)

FOREIGN PATENT DOCUMENTS

EP    1076081    2/2001
WO    WO 95-13331    5/1995
(Continued)

OTHER PUBLICATIONS

Boutevin,"Synthesis of Photocrosslinkable Fluorinated Polydimethylsiloxanes: Direct Introduction of Acrylic Pendant Groups via Hydrosilylation," Journal of Polymer Science: Part A: Polymer Chemistry, 2000, vol. 38, No. 20, pp. 3722-3728.
(Continued)

*Primary Examiner* — Victor Chang
(74) *Attorney, Agent, or Firm* — Adrian L. Pishko

(57) ABSTRACT

An adhesive article including a pressure sensitive adhesive layer and a release layer in contact with the pressure sensitive adhesive layer. The release layer includes a polymer matrix that includes polymerized (meth)acrylated silicone and a plurality of nanovoids.

20 Claims, 2 Drawing Sheets

(51) Int. Cl.
*B82Y 30/00* (2011.01)
*C09D 183/04* (2006.01)
*C08K 3/36* (2006.01)
*C08K 9/04* (2006.01)
*C08G 77/20* (2006.01)

(52) U.S. Cl.
CPC ..... *C09J 2433/005* (2013.01); *C09J 2483/005* (2013.01); *Y10T 428/1405* (2015.01); *Y10T 428/1457* (2015.01)

(56) References Cited

U.S. PATENT DOCUMENTS

| | | |
|---|---|---|
| 4,181,752 A | 1/1980 | Martens |
| 4,379,201 A | 4/1983 | Heilmann |
| 4,418,120 A | 11/1983 | Kealy |
| 4,460,712 A | 7/1984 | Blizzard |
| 4,522,958 A | 6/1985 | Das |
| 4,737,559 A | 4/1988 | Kellen |
| 7,371,464 B2 | 5/2008 | Sherman |
| 7,914,645 B2 | 3/2011 | Schalau |
| 8,808,811 B2 | 8/2014 | Kolb |
| 2009/0149573 A1 | 6/2009 | Venzmer |
| 2010/0279469 A1 | 11/2010 | Jin |
| 2012/0038990 A1 | 2/2012 | Hao |

FOREIGN PATENT DOCUMENTS

| | | |
|---|---|---|
| WO | WO 01-85865 | 11/2001 |
| WO | WO 2009-086079 | 7/2009 |
| WO | WO 2010-120468 | 10/2010 |
| WO | WO 2010-120864 | 10/2010 |

OTHER PUBLICATIONS

International Search Report for PCT International Application No. PCT/US2012/069409, mailed on Apr. 24, 2013, 3 pages.

Kobayashi, "Porous Membrane of Polydimethylsiloxane by Hydrosilylation Cure: Characteristics of Membranes Having Pores Formed by Hydrogen Foams," Journal of Applied Polymer Science, 1993, vol. 50, pp. 971-979.

Ou, "A Simple Method for Preparation of Macroporous Polydimethylsiloxane Membrane for Microfluidic Chip-Based Isoelectric Focusing Applications," Analytica Chimica Acta, 2010, vol. 662, pp. 200-205.

TEGO® Rad 2250 Data Sheet, EVONIK Industries, Evonik Tego Chemie GmbH, Essen, Germany, 2010, 1 pg.

TEGO® Rad 2300 Data Sheet, EVONIK Industries, Evonik Goldschmidt GmbH, Essen, Germany, 2011, 1 pg.

TEGO® RC 902 Data Sheet, EVONIK Industries, Evonik Goldschmidt GmbH, Essen, Germany, 2009, 2 pgs.

ADHESIVE ARTICLE WITH RELEASE LAYER INCLUDING POLYMERIZED (METH)ACRYLATED SILICONE

CROSS REFERENCE TO RELATED APPLICATIONS

This application is a national stage filing under 35 U.S.C. 371 of PCT/US2012/069409, filed Dec. 13, 2012, which claims priority to Provisional Application No. 61/579,314, filed Dec. 22, 2011, the disclosure of which is incorporated by reference in its/their entirety herein.

BACKGROUND

Release surfaces are well known, for example in the pressure sensitive adhesive tape industry to provide a release surface so that a tape can be unwound from a roll without the adhesive sticking to the backside of the tape. The release coating can also be coated onto a liner which serves as a carrier for a pressure sensitive adhesive transfer tape or a double coated tape, both of which are tacky on both sides of the tape. Release surfaces are also useful as a release liner for use with pressure sensitive adhesive films.

Materials commonly used for release surfaces and coatings are silicone compositions because they can be formulated to provide varying levels of release from a "premium" release (i.e., the force to unwind the tape is very low) to a "low adhesion backsize" release which typically requires a greater force to unwind. Polyethylene has also been used as a release material and can be coated onto Kraft papers for a release liner or it can be used as a single layer film, or a multi-layer film with polyethylene co-extruded with or laminated to a base layer such as high density polyethylene, and the like.

There remains an ongoing need for release liners for pressure sensitive adhesives.

SUMMARY

The present disclosure is directed to an adhesive article comprising a pressure sensitive adhesive layer and a release layer in contact with the pressure sensitive adhesive layer, wherein the release layer is disposed on a substrate. The release layer includes a polymer matrix that includes polymerized (meth)acrylated silicone and a plurality of nanovoids.

In one embodiment, the present disclosure provides an adhesive article that includes a pressure sensitive adhesive layer and a release layer disposed on a substrate, wherein the release layer is in contact with the pressure sensitive adhesive layer, and the release layer includes a polymer matrix including polymerized polyether-free (meth)acrylated silicone and a plurality of nanovoids; wherein a volume fraction of the plurality of nanovoids in the release layer is no more than 0.5.

In another embodiment, there is provided an adhesive article including a pressure sensitive adhesive layer and a release layer disposed on a substrate, wherein the release layer is in contact with the pressure sensitive adhesive layer. Further, in this article, the release layer is formed by a process that includes: providing a first solution including a polymerizable material in a solvent, wherein the polymerizable material includes a (meth)acrylated silicone; at least partially polymerizing the polymerizable material to form a composition including an insoluble polymer matrix and a second solution, wherein the insoluble polymer matrix includes a plurality of nanovoids that are filled with the second solution; and removing a major portion of the solvent from the second solution; wherein the release layer demonstrates a change in haze of at least 2× relative to the same composition polymerized in the absence of the solvent.

In yet another embodiment, the present disclosure provides a method of varying the release properties of a polymerized material, the method includes: providing a first solution comprising a polymerizable material in a solvent, wherein the polymerizable material includes a (meth)acrylated silicone; applying energy to at least partially polymerize the polymerizable material to form a composition comprising an insoluble polymer matrix and a second solution, wherein the insoluble polymer matrix comprises a plurality of nanovoids that are filled with the second solution; and removing a major portion of the solvent from the second solution to form a polymerized material having release properties; wherein the energy of polymerization is controlled to provide the polymerized material with a desired level of release.

As used herein, "pores" and "voids" refer to the polymer-free regions within a nanovoided layer that can be either partially, or totally, surrounded by the polymer matrix. "Void" is a broader term that refers to any polymer-free region, no matter how small in volume, and is only limited by the size of the nanovoided layer. "Pore" is a subset of "void," and generally refers to a polymer-free region that extends substantially through the polymer matrix. A "pore" can be extensive throughout the nanovoided layer, and in some embodiments connects one surface of the layer to the other. The term "nanovoid" in the context of a nanovoided layer refers to voids having a distribution of sizes with an average void size in the nanoscale range. Typically, the average void sizes are less than 1 micron, more likely less than 600 nm, and most likely less than 300 nm.

A "polyether-free" (meth)acrylated silicone refers to a (meth)acrylated silicone having less than 5 wt-% or less than 1 wt-% polyether moieties.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

FIGURES

DETAILED DESCRIPTION OF ILLUSTRATIVE EMBODIMENTS

Figure 1:
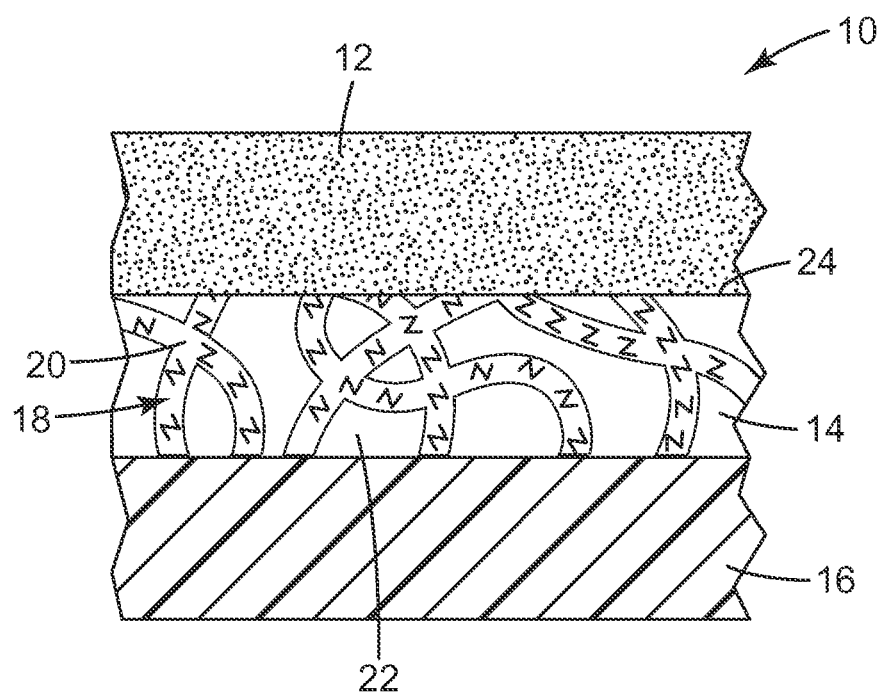
FIG. 1 shows a pressure sensitive adhesive article that includes a pressure sensitive adhesive layer and a release layer in contact with the pressure sensitive adhesive layer.

The present disclosure provides an adhesive article comprising a pressure sensitive adhesive layer and a release layer in contact with the pressure sensitive adhesive layer, wherein the release layer is disposed on a substrate. The release layer includes a polymer matrix that includes polymerized (meth) acrylated silicone and a plurality of nanovoids.

In certain embodiments, the release layer includes a volume fraction of nanovoids (i.e., void fraction) of no more than 0.5, more preferably no more than 0.4, even more preferably no more than 0.3, and even more preferably no more than 0.2. In certain embodiments, the release layer includes a volume fraction of nanovoids (i.e., void fraction) of no less than 0.01, and preferably no less than 0.05, and more preferably no less than 0.1, and even more preferably no less than 0.15.

The release layer is made by a process described in International Publication No. WO 2010/120468 (Kolb et al.). The process uses a solution including radiation-curable materials in a solvent. The solvent can be a mixture of solvents, and particularly well suited solvent(s) are those that are not reactive with the polymerizable materials. During polymerization, the solubility of the formed polymer in the solvent decreases and it separates from the solution, resulting in an insoluble polymer matrix and a phase separated solvent rich network. The solvent is subsequently removed, leaving pores and voids which yield the nanovoided release layer.

More specifically, a release layer of the present disclosure can be prepared using a process that involves coating a dispersion that includes an ultraviolet (UV) radiation curable material, a photoinitiator, a solvent, and optionally a plurality of nanoparticles on a substrate. The process further includes irradiating the dispersion with UV radiation to at least partially polymerize the radiation curable material, forming an insoluble polymer matrix (which binds the plurality of nanoparticles if they are present) and including a plurality of nanovoids filled with the dispersion depleted of the polymerizable material (and the nanoparticles if present). The process further includes removing a major portion of the solvent from the dispersion after at least partially polymerizing the polymerizable material, leaving pores and voids which yield the nanovoided release layer.

The effective diameter of any pore or void can be related to the diameter of a circle having the same cross-sectional area as the pore or void, and this effective diameter can be averaged over the dimensions of the release layer to provide an average effective diameter. Nanovoided release layer can be "open-cell" structures, in which the pores or voids are in communication with the surrounding environment. Alternatively, nanovoided release layers can be "closed-cell" structures in which the pores or voids are surrounded by the solid network or matrix, sealing them from the surrounding environment. In many cases, nanovoided release layers include a combination of open-cell and closed-cell structures.

FIG. 1 is a representation of a pressure sensitive adhesive article 10 (which is not to scale) that includes a pressure sensitive adhesive layer 12 and a release layer 14 in contact with the pressure sensitive adhesive layer; wherein the release layer 14 is disposed on a substrate 16, and wherein the release layer 14 comprises a polymer matrix 18 comprising polymerized (meth)acrylated silicone 20 (preferably, polyether-free (meth)acrylated silicone) and a plurality of nanovoids 22. The pressure sensitive adhesive layer 12 and the release layer 14 form an interface 24, which may or may not be structured. That is, the surface of the release layer may be smooth or rough (i.e., structured). The roughness is typically the result of surface voids. Optionally, the polymer matrix may include a plurality of nanoparticles.

Figure 2:
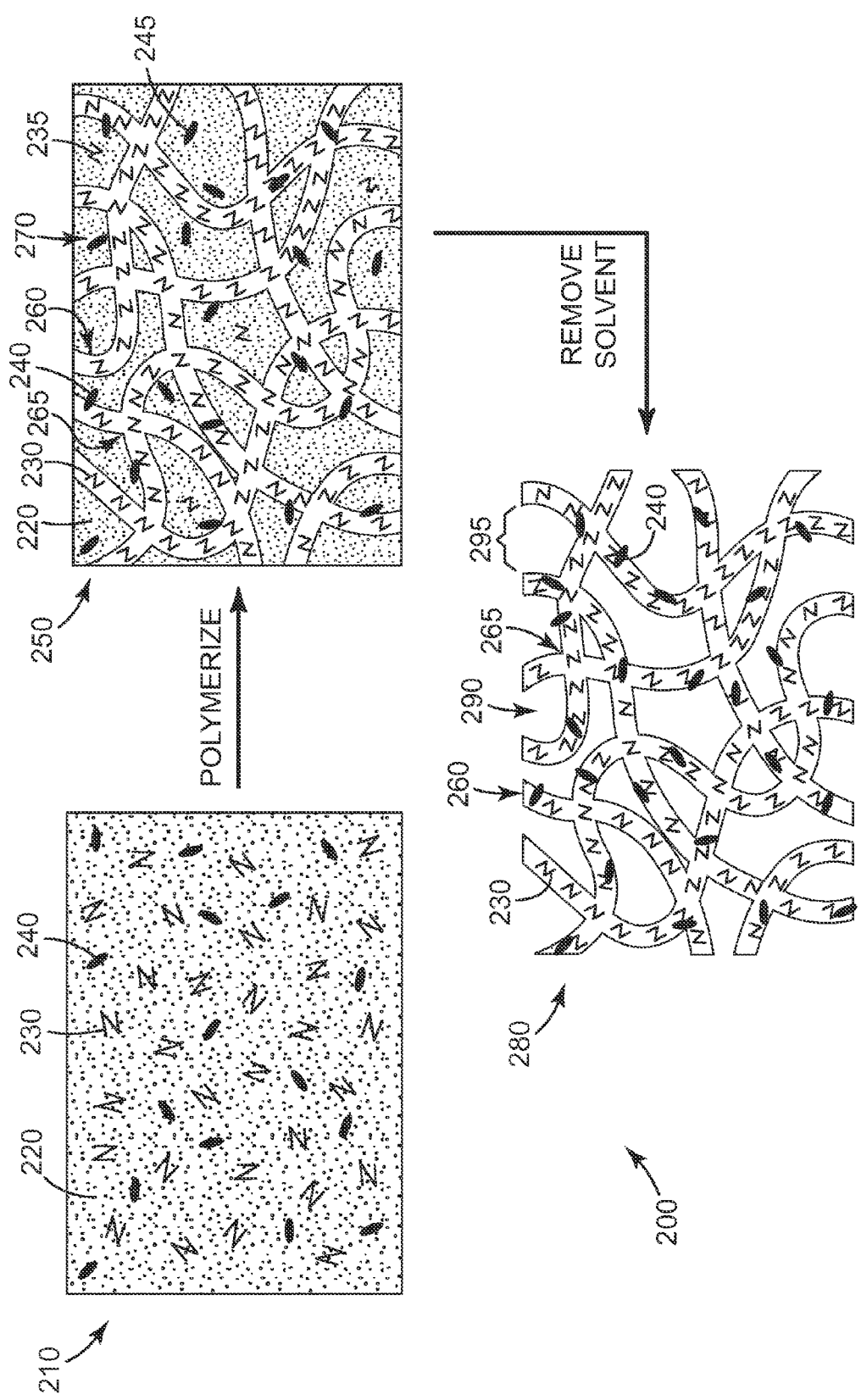
FIG. 2 is a schematic view of a process for forming a nanovoided release layer.

FIG. 2 shows a schematic view of a process 200 for forming a nanovoided release layer 280 according to another aspect of the disclosure. In this schematic, the release layer includes a plurality of nanoparticles, but these are not a requirement of the present disclosure. A first solution 210 that includes a polymerizable material 230 and nanoparticles 240 in a solvent 220 is provided. The first solution 210 is at least partially polymerized to form a composition 250 including the nanoparticles 240 bound to an insoluble polymer matrix 260 in a second solution 270. A major portion of the solvent 220 is removed from the second solution 270 to form the nanovoided release layer 280. In one particular embodiment, the insoluble polymer matrix 260 can be a three-dimensional polymer matrix having polymer chain linkages 265 that provide the three-dimensional framework. The polymer chain linkages 265 can prevent deformation of the insoluble polymer matrix 260 after removal of the solvent 220.

In some embodiments, the second solution 270 can include some remaining polymerizable material 235 that is not incorporated in the insoluble polymer matrix 260, as shown in FIG. 2 (i.e., the second solution 270 has become depleted of polymerizable material 235, but some may still be present). It is preferred to minimize the amount of remaining polymerizable material 235 in the second solution 270, after the polymerizing step. In some embodiments, the second solution 270 can also include a minor portion of nanoparticles 245 that are not bound to the insoluble polymer matrix 260, as shown in FIG. 2 (i.e., the second solution 270 has become depleted of nanoparticles 240, but some may still be present). It is generally desired to minimize the quantity of nanoparticles 245 that are not bound to the insoluble polymer matrix 260 after the polymerizing step. As used herein, nanoparticles "bound to" the polymer matrix is meant to include nanoparticles completely embedded in the polymer matrix, nanoparticles partially embedded in the polymer matrix, nanoparticles attached to the surface of the polymer matrix, or a combination thereof.

In one particular embodiment, nanoparticles 240 can be surface-modified reactive nanoparticles. Typically, at least a portion of these can be chemically bound to the insoluble polymer matrix 260. In one particular embodiment, nanoparticles 240 can be surface-modified non-reactive nanoparticles. Typically, at least a portion of these can be physically bound to the insoluble polymer matrix 260. In one particular embodiment, nanoparticles 240 can be a mixture of surface-modified reactive and non-reactive nanoparticles.

Nanovoided release layer 280 includes the nanoparticles 240 bound to the insoluble polymer matrix 260, and a plurality of voids 290 having an average effective diameter 295. Although not shown in FIG. 2, it is to be understood that the first solution 210 can be coated on a substrate to form a nanovoided coating on the substrate.

The polymerizable material includes (meth)acrylated silicones, which are optionally fluorinated. Selection of (meth)acrylated silicones can be based on haze level of the material. This is because haze is directly related to the coating morphology, e.g., void size and distribution, particularly surface roughness of the polymerized material, and, surface roughness is an indirect measure of the release properties of the material. The larger the voids and the greater the difference in refractive index between the resulting air voids and the polymer matrix, the more the coating will scatter light, and the higher the haze. Thus, typically, as the surface roughness increases, the haze level increases, which is typically an indication of an increase in the release properties of the material.

In certain embodiments, useful (meth)acrylated silicones for release layers of the present disclosure are those that demonstrate a change in haze of at least 2× (or at least 3×, at least 4×, at least 5×, or at least 10×) relative to the same composition polymerized in the absence of a solvent. Preferably, such composition includes less than 75 wt-% nanoparticles. This is demonstrated by the tests described in the Examples Section, wherein "0 (off) UV LED" in Table 1 means that there is no UV light exposure when solvent is present but curing occurs in a conventional manner). That is, when a release layer that includes a suitable (meth)acrylated silicone is polymerized in accordance with the process of the disclosure, it demonstrates a change in haze of at least 2× (or at least 3×, at least 4×, at least 5×, or at least 10×) relative to the same composition polymerized in the absence of a solvent ("0 (off)" UV LED current, e.g., as shown in Table 1). Preferably, such determination of a suitable material is made when the composition includes less than 75 wt-% nanoparticles. At 75 wt-% or more nanoparticles, depending on the particle size, the particle packing may cause voids in a coating polymerized conventionally; however, if polymerized according to the method described herein, the haze may increase or decrease. Thus, preferably, release layers of the present disclosure include less than 75 wt-% nanoparticles. In certain embodiments, useful (meth)acrylated silicones are polyether-free.

Useful silicone (meth)acrylates are described in U.S. Pat. App. No. 2009/0149573 (Venzmer et al.). Examples of useful polyether-free silicone (meth)acrylates include those available under the trade designations TEGO 2500 (acrylic-modified polydimethylsiloxane), TEGO 2600 (acrylic-modified polysiloxane), TEGO 2650 (acrylic-modified polysiloxane), and TEGO 2700 (acrylic-modified polysiloxane), obtainable from Evonik Goldschmidt GmbH. By contrast, examples of polyether-containing silicone (meth)acrylates that are generally not suitable for use in the release layer of the present disclosure include those available under the trade designations TEGO 2200 N (silicone polyether acrylate), TEGO 2250 (silicone polyether acrylate), TEGO 2300 (silicone polyether acrylate), and TEGO 2350 (silicone polyether acrylate), obtainable from Evonik Goldschmidt GmbH.

Another useful polyether-free silicone (meth)acrylate is TEGO RC 902 (meth)acrylate modified polydialkylsiloxane, which is commercially available from Th. Goldschmidt AG, Essen, Germany. This polymer is disclosed in EP 1076081 A1 and is believed to be $$(F1,F2,F3)\text{-}[(CH_3)_2SiO]_{56}Si(CH_3)_2\text{---}(F1,F2,F3)$$

wherein:
F1 is —$(CH_2)_3OCH_2C(CH_2CCH_3)(CH_2O(CO)CH=CH_2)_2$
F2 is —$(CH_2)_3O(CO)CH_2O(CO)CH=CH_2$
F3 is —$(CH_2)_3O(CO)(CH_2)_2OCH_2C(CH_2CH_3)(CH_2O(CO)CH=CH_2)$ with F1 being the major end group and F2, F3 being end groups that are present in minor amounts only. TEGO RC 902 has a ratio of the average number of dimethylsiloxane groups —$OSi(CH_3)_2$— to the average number of the sum of (meth)acrylate groups of approximately 14.0. This material has two polymerizable groups per molecule.

Fluorinated (meth)acrylated silicones can also be used in the present disclosure. Examples of such materials are described in B. Boutevin, "Synthesis of photocrosslinkable fluorinated polydimethylsiloxanes: direct introduction of acrylic pendant groups via hydrosilylation," *Journal of Polymer Science. Part A, Polymer Chemistry* (0887-624X), 38(20), p. 3722 (2000).

Significantly, the method of the present disclosure provides more control over void volume and size than would be conventionally produced using silicone foams.

For a release coating of the present disclosure, the amount of (meth)acrylated silicone would typically be at least 10 wt-%, based on total weight of polymerizable material. Preferably, the amount of (meth)acrylated silicone is at least 25 wt-%, or at least 50 wt-%, based on total weight of polymerizable material. For a release coating of the present disclosure, the amount of (meth)acrylated silicone can be up to 100 wt-%, based on total weight of polymerizable material. Often, the amount of (meth)acrylated silicone is up to 75 wt-% or up to 50 wt-%, based on total weight of polymerizable material.

The polymerizable (meth)acrylated silicones can be polymerized by various conventional cationic or free radical polymerization techniques, which can be chemical, thermal, or radiation initiated, including, e.g., solvent polymerization, emulsion polymerization, suspension polymerization, bulk polymerization, and radiation polymerization, including, e.g., processes using actinic radiation including, e.g., visible and ultraviolet light, electron beam radiation and combinations thereof.

Actinic radiation curable (meth)acrylated silicones include monomers, oligomers, and polymers, including multifunctional monomers that can form a crosslinked network upon polymerization can be used, as known in the art. The polymerizable (meth)acrylated silicones materials can include any mixture of monomers, oligomers and polymers; however the materials must be at least partially soluble in at least one solvent. In some embodiments, the materials should be soluble in the solvent monomer mixture.

As used herein, the term "monomer" means a relatively low molecular weight material (i.e., having a molecular weight less than 500 g/mole) having one or more energy polymerizable groups. "Oligomer" means a relatively intermediate molecular weight material having a molecular weight of from 500 up to 10,000 g/mole. "Polymer" means a relatively high molecular weight material having a molecular weight of at least 10,000 g/mole, preferably 10,000 to 100,000 g/mole. The term "molecular weight" as used throughout this specification means number average molecular weight unless expressly noted otherwise.

Referring again to FIG. 2, solvent 220 can be any solvent that forms a solution with the desired polymerizable material 230. The solvent can be a polar or a non-polar solvent, a high boiling point solvent or a low boiling point solvent, and a mixture of several solvents may be preferred. The solvent or solvent mixture may be selected so that the insoluble polymer matrix 260 formed is at least partially insoluble in the solvent (or at least one of the solvents in a solvent mixture). In some embodiments, the solvent mixture can be a mixture of a solvent and a non-solvent for the polymerizable material. During polymerization, the first solution 210 separates to form the second solution 270 and a polymer-rich solution that polymerizes to form the insoluble polymer matrix 260.

Exemplary solvents include linear, branched, and cyclic hydrocarbons, alcohols, ketones, and ethers, including for example, propylene glycol ethers such as propylene glycol methyl ether (DOWANOL PM), isopropyl alcohol, ethanol, toluene, ethyl acetate, 2-butanone, butyl acetate, methyl isobutyl ketone, water, methyl ethyl ketone, cyclohexanone, acetone, aromatic hydrocarbons, isophorone, butyrolactone, N-methylpyrrolidone, tetrahydrofuran, esters such as lactates, acetates, propylene glycol monomethyl ether acetate (PM acetate), diethylene glycol ethyl ether acetate (DE acetate), ethylene glycol butyl ether acetate (EB acetate), dipropylene glycol monomethyl acetate (DPM acetate), iso-alkyl esters, isohexyl acetate, isoheptyl acetate, isooctyl acetate, isononyl acetate, isodecyl acetate, isododecyl acetate, isotridecyl acetate or other iso-alkyl esters; combinations of these and the like.

The optional nanoparticles 240 shown in FIG. 2 can be inorganic nanoparticles, organic (e.g., polymeric) nanoparticles, or a combination of organic and inorganic nanoparticles. In one particular embodiment, particles 240 can be porous particles, hollow particles, solid particles, or a combination thereof. Examples of suitable inorganic nanoparticles include silica and metal oxide nanoparticles including zirconia, titania, ceria, alumina, iron oxide, vanadia, antimony oxide, tin oxide, alumina/silica, and combinations thereof. The nanoparticles can have an average particle diameter less than 1000 nm, less than 100 nm, or less than 50 nm. In some embodiments, the nanoparticles have an average particle diameter of 3 nm to 50 nm, or 3 nm to 35 nm, or 5 nm to 25 nm. If the nanoparticles are aggregated, the average cross sectional dimension of the aggregated particle can be within any of these ranges, and can also be greater than 100 nm. In some embodiments, "fumed" nanoparticles, such as silica and alumina, with primary size less than 50 nm, are also included, such as CAB-O-SPERSE PG 002 fumed silica, CAB-O-SPERSE 2017A fumed silica, and CAB-O-SPERSE PG 003 fumed alumina, available from Cabot Co. Boston, Mass.

The nanoparticles may be provided in the form of a colloidal dispersion. Examples of useful commercially available unmodified silica starting materials include nano-sized colloidal silicas available under the product designations NALCO 1040, 1050, 1060, 2326, 2327, and 2329 colloidal silica from Nalco Chemical Co., Naperville, Ill.; the organosilica under the product name IPA-ST-MS, IPA-ST-L, IPA-ST, IPA-ST-UP, MA-ST-M, and MA-ST sols from Nissan Chemical America Co. Houston, Tex. and the SnowTex ST-40, ST-50, ST-20L, ST-C, ST-N, ST-O, ST-OL, ST-ZL, ST-UP, and ST-OUP, also from Nissan Chemical America Co. Houston, Tex.

In some embodiments, the nanoparticles 240 are surface modified, that is, they include surface groups selected from the group consisting of hydrophobic groups, hydrophilic groups, and combinations thereof. In other embodiments, the nanoparticles include surface groups derived from an agent selected from the group consisting of a silane, organic acid, organic base, and combinations thereof. In other embodiments, the nanoparticles include organosilyl surface groups derived from an agent selected from the group consisting of alkylsilane, arylsilane, alkoxysilane, and combinations thereof.

The term "surface-modified nanoparticle" refers to a particle that includes surface groups attached to the surface of the particle. The surface groups modify the character of the particle. The terms "particle diameter" and "particle size" refer to the average cross-sectional dimension of a particle. If the particle is present in the form of an aggregate, the terms "particle diameter" and "particle size" refer to the average cross-sectional dimension of the aggregate. In some embodiments, particles can be large aspect ratio aggregates of nanoparticles, such as fumed silica particles.

The surface-modified nanoparticles have surface groups that modify the solubility characteristics of the nanoparticles. The surface groups are generally selected to render the particle compatible with the first solution 210 (FIG. 2). In one embodiment, the surface groups can be selected to associate or react with at least one component of the first solution 210, to become a chemically bound part of the polymerized network.

A variety of methods are available for modifying the surface of nanoparticles including, e.g., adding a surface modifying agent to nanoparticles (e.g., in the form of a powder or a colloidal dispersion) and allowing the surface modifying agent to react with the nanoparticles. Other useful surface modification processes are described in, e.g., U.S. Pat. No. 2,801,185 (Iler) and U.S. Pat. No. 4,522,958 (Das et al.).

Useful surface-modified silica nanoparticles include silica nanoparticles surface-modified with silane surface modifying agents including, e.g., SILQUEST silanes such as SILQUEST A-1230 from GE Silicones, 3-acryloyloxypropyl trimethoxysilane, 3-methacryloyloxypropyltrimethoxysilane, 3-mercaptopropyltrimethoxysilane, n-octyltrimethoxysilane, isooctyltrimethoxysilane, 4-(triethoxysilyl)-butyronitrile, (2-cyanoethyl)triethoxysilane, N-(3-triethoxysilylpropyl)methoxyethoxyethoxyethyl carbamate (PEG3TMS), N-(3-triethoxysilylpropyl)methoxyethoxyethoxyethyl carbamate (PEG2TMS), 3-(methacryloyloxy) propyltriethoxysilane, 3-(methacryloyloxy)propylmethyldimethoxysilane, 3-(acryloyloxypropyl) methyldimethoxysilane, 3-(methacryloyloxy) propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, and combinations thereof. Silica nanoparticles can be treated with a number of surface modifying agents including, e.g., alcohol, organosilane including, e.g., alkyltrichlorosilanes, trialkoxyarylsilanes, trialkoxy(alkyl)silanes, and combinations thereof and organotitanates and mixtures thereof.

The release coating often contains up to 90 wt-% surface modified nanoparticles, based on the total solids. For example, the release coating can contain up to 75 wt-%, or up to 50 wt-%, surface modified nanoparticles. The release coating often contains 0 to 90 wt %, 0 to 75 wt-%, 10 to 75 wt-%, or 25 to 75 wt-% surface modified nanoparticles, based on the total solids. This amount can depend on the density and size of the nanoparticle used.

The first solution can also include other ingredients including, e.g., initiators, curing agents, cure accelerators, catalysts, crosslinking agents, tackifiers, plasticizers, dyes, pigments, impact modifiers including thermoplastic or thermoset polymers, fillers, glass and polymer microspheres and microparticles, other particles including electrically conductive particles, fibers, antistatic agents, and the like.

An initiator, such as a photoinitiator, can be used in an amount effective to facilitate polymerization of the monomers present in the first solution. The amount of photoinitiator can vary depending upon, for example, the type of initiator, the molecular weight of the initiator, the intended application of the resulting insoluble polymer matrix and the polymerization process including, e.g., the temperature of the process and the wavelength of the actinic radiation used. Useful photoinitiators include, for example, those available from Ciba Specialty Chemicals under the IRGACURE and DAROCURE trade designations, including IRGACURE 184 and IRGACURE 819.

In some embodiments, a mixture of initiators and initiator types can be used, for example to control the polymerization in different sections of the process. In one embodiment, optional post-processing polymerization may be a thermally initiated polymerization that requires a thermally generated free-radical initiator. In other embodiments, optional post-processing polymerization may be an actinic radiation initiated polymerization that requires a photoinitiator. The post-processing photoinitiator may be the same or different than the photoinitiator used to polymerize the polymer matrix in solution.

The insoluble polymer matrix may be crosslinked to provide a more rigid polymer network. Crosslinking can be achieved with a crosslinking agent by using high energy radiation such as gamma or electron beam radiation. In some embodiments, a crosslinking agent or a combination of crosslinking agents can be added to the mixture of polymerizable monomers. The crosslinking can occur during polymerization of the polymer network using any of the actinic radiation sources described elsewhere.

Useful radiation curing crosslinking agents include multifunctional hydrocarbon acrylates and methacrylates, such as those disclosed in U.S. Pat. No. 4,379,201 (Heilmann et al.), which include 1,6-hexanediol di(meth)acrylate, trimethylolpropane tri(meth)acrylate, 1,2-ethylene glycol di(meth)acrylate, pentaerythritol tri/tetra(meth)acrylate, triethylene glycol di(meth)acrylate, ethoxylated trimethylolpropane tri(meth)acrylate, glycerol tri(meth)acrylate, neopentyl glycol di(meth)acrylate, tetraethylene glycol di(meth)acrylate, 1,12-dodecanol di(meth)acrylate, copolymerizable aromatic ketone co-monomers such as those disclosed in U.S. Pat. No 4,737,559 (Kellen et al.) and the like, and combinations thereof. One particular example of a hydrocarbon mutifunctional (meth)acrylate is pentaerythritol triacrylate, obtained from Sartomer Company, Exton, Pa. under trade designation SR 444.

For a release coating of the present disclosure, the amount of a mutlifunctional hydrocarbon crosslinking agent, if used, would typically be less than 70 wt-%, based on the total weight of polymerizable material. Preferably, if used, the amount of such hydrocarbon crosslinking agent is less than 50 wt-%, based on total weight of polymerizable material.

Preferred silicone (meth)acrylate monomers are themselves multifunctional, and thus function as a crosslinker themselves. Incorporation of one or more hydrocarbon crosslinkers can be done to replace some of the silicone (meth)acrylate with a less expensive hydrocarbon and/or modify the flexibility of the release coating. If used, a hydrocarbon crosslinker can be used in an amount of at least 10 wt-%, or at least 25 wt-%, based on the total weight of polymerizable material.

The first solution may also include a chain transfer agent. The chain transfer agent is preferably soluble in the monomer mixture prior to polymerization. Examples of suitable chain transfer agents include triethyl silane and mercaptans. In some embodiments, chain transfer can also occur to the solvent; however this may not be a preferred mechanism.

The polymerizing step preferably includes using a radiation source in an atmosphere that has a low oxygen concentration. Oxygen is known to quench free-radical polymerization, resulting in diminished extent of cure. The radiation source used for achieving polymerization and/or crosslinking may be actinic (e.g., radiation having a wavelength in the ultraviolet or visible region of the spectrum), accelerated particles (e.g., electron beam radiation), thermal (e.g., heat or infrared radiation), or the like. In some embodiments, the energy is actinic radiation or accelerated particles, because such energy provides excellent control over the initiation and rate of polymerization and/or crosslinking. Additionally, actinic radiation and accelerated particles can be used for curing at relatively low temperatures. This avoids degrading or evaporating components that might be sensitive to the relatively high temperatures that might be required to initiate polymerization and/or crosslinking of the energy curable groups when using thermal curing techniques. Suitable sources of curing energy include UV LEDs, visible LEDs, lasers, electron beams, mercury lamps, xenon lamps, carbon arc lamps, tungsten filament lamps, flashlamps, sunlight, low intensity ultraviolet light (black light), and the like.

A major portion of the solvent is removed in the solvent removal step to produce the nanovoided release layer. By a major portion of the solvent is meant greater than 90%, 80%, 70%, 60%, or greater than 50% by weight of the solvent. Solvent can be removed by drying in a thermal oven that can include air floatation/convection, drying with infrared or other radiant light sources, vacuum drying, gap drying, or a combination of drying techniques. The choice of drying technique can be governed by the desired process speed, extent of solvent removal, and expected coating morphology, among others. In one particular embodiment, gap drying can offer advantages for solvent removal, as gap drying offers rapid drying within minimal space.

The process of making the release material is more fully described in International Publication No. WO 2010/120468 (Kolb et al.). In sum, a release layer can be formed by a process that includes: providing a first solution that includes a polymerizable material in a solvent, wherein the polymerizable material includes a (meth)acrylated silicone; at least partially polymerizing the polymerizable material to form a composition that includes an insoluble polymer matrix and a second solution, wherein the insoluble polymer matrix includes a plurality of nanovoids that are filled with the second solution; and removing a major portion of the solvent from the second solution. Optionally, the resultant polymerized material can be post-polymerized using, for example, UV irradiation.

Data presented herein show that release properties of the release layer (i.e., release material) can be modified or controlled by changing the amount of energy used to polymerize the (meth)acrylated silicone. That is, using the same formulation, its release characteristics can be varied or controlled by varying or controlling the energy of polymerization (i.e., energy input, e.g., number of joules of UV radiation) used in the process. Stated another way, the energy of polymerization can be controlled to provide the polymerized material with a desired level of release.

A release liner (i.e., release layer on a substrate) can be prepared by applying a coating composition as described above onto a base material (i.e., substrate). Examples of suitable base materials (i.e., substrates) include cellulosic materials such as paper, woven nonwoven fabrics, films such as nylon, polyester, polyolefins, acrylonitrile butadiene styrene, and sheet materials made of materials such as metal, ceramic, or plastic. The base material can also be a sheet material suitable for thermoforming or vacuum forming so that trays can be formed having a release surface for holding pressure sensitive adhesive coated parts. The thickness of the release layer should be sufficient to provide the desired release force.

In a typical process to make pressure sensitive adhesive transfer tapes, an adhesive composition is coated onto a release liner of the present disclosure. The adhesive is then cured to form a gelled film on the liner, and the release liner with the adhesive is rolled up into a large roll. Alternatively, the adhesive may be coated and cured on one liner, and then transferred onto a different liner before converting. The release liner of the invention can be one or the other or both of the two liners described. In some embodiments, the adhesive does not require any curing after coating. The adhesive coated sheet is then converted into narrow rolls by slitting the large roll and winding the narrow width tape onto cores for customer use.

In another embodiment, the release liner of the disclosure is useful on a large format film, such as a graphic film. A variety of substrates are used in graphic film for advertising and promotional displays. The substrate may comprise a polymeric sheet material such as an acrylic-containing film, a poly(vinyl chloride)-containing film, a poly(vinyl fluoride)-containing film, a urethane-containing film, a melamine-containing film, a polyvinyl butyral-containing film, a polyolefin-containing film, a polyester-containing film and a polycarbonate-containing film. For graphic films, it is desirable to have a film that accommodates curves, depressions or projections on a substrate surface so that the film may be stretched around curves or projections, or may be pressed down into depressions without breaking or delaminating the film (conformability). It is also desirable to have a film that can be applied over irregular and/or uneven surfaces without subsequent delaminating or releasing from the substrate surface (popping-up). In addition, it is desirable that graphic films are imageable (i.e., have a receptive surface for printing and/or graphics) and exhibit good weathering for outdoor applications. An adhesive layer is on the graphic film and the release liner is on the adhesive opposite the graphic film.

Examples of adhesives include pressure sensitive adhesives, hot melt or heat activated adhesives that are pressure sensitive at the time of application, and any other type of PSA disclosed in *Handbook of Pressure-Sensitive Adhesives*, Ed. D. Satas, 2nd Edition, Von Nostrand Reinhold, N.Y., 1989. Exemplary acrylate-based PSA's which are particularly useful in the present disclosure include those described in U.S. Pat. No. 4,181,752 (Clemens et al.), U.S. Pat. No. 4,418,120 (Kealy et al.), and International Publication No. WO 95/13331 (Bennett et al.). Exemplary silicone-based PSA's which are particularly useful in the present disclosure include those described in U.S. Pat. No. 7,371,464 (Sherman et al.) and U.S. Pat. No. 7,914,645 (Schalau, I I et al.).

Generally, the adhesive layer has a peel strength from the release liner, for example a 180° peel strength at 90 inches/minute of less than 30 grams/inch (g/in) for "premium release" as may be required for films requiring a release liner. Generally, other uses require a higher than 30 g/in release. Other embodiments require a low release value, for example under 20 g/in.

In some embodiments, the adhesive is a (meth)acrylic adhesive, comprising a (meth)acrylic acid esters and a reinforcing comonomer. Suitable acrylic acid ester monomers include 2-ethylhexyl acrylate, isooctyl acrylate, isobornyl acrylate, isononyl acrylate, n-butyl acrylate, decyl acrylate, dodecyl acrylate, cyclohexyl acrylate, and mixtures thereof. Preferred monomers include isooctyl acrylate, n-butyl acrylate, octadecyl acrylate, and mixtures thereof.

Useful reinforcing comonomers include acrylic acid, methacrylic acid, itaconic acid, acrylamide, substituted acrylamides, N-vinyl pyrrolidone, N-vinyl caprolactam, and vinyl acetate. Preferred comonomers include N-vinyl caprolactam, substituted acrylamides such as N,N-dimethylacrylamide, and isobutyl acrylate.

Suitable initiators can be used to make pressure adhesives useful in the practice of the present disclosure. The types and amounts of initiators can be used in amounts suitable to effect the type of polymerization used, e.g., photoinitiators such as benzyl dimethyl ketal can be used in amounts from 0.1 to 5 parts per hundred parts of monomer for ultraviolet light photopolymerized adhesives, and 2,2'-azobis(isobutyronitrile) may be used for solvent polymerization in amounts of 0.1 part to 2 parts per hundred parts of monomer.

Useful pressure sensitive adhesives may also include additives such as crosslinking agents, tackifiers, plasticizers, fillers, gases, blowing agents, glass or polymeric microspheres, silica, calcium carbonate fibers, surfactants, and the like. The additives are included in amounts sufficient to effect the desired properties.

Useful pressure sensitive adhesives may also contain thermosettable resins such as epoxies and urethanes, which can be heat cured after the pressure sensitive adhesive tape has been applied to a surface to form a thermosetting adhesive.

Useful pressure sensitive adhesives may be prepared by methods that are known in the industry, including solvent polymerization, radiation polymerization by such means as electron beam, gamma radiation, and ultraviolet radiation, emulsion polymerization, and the like. Methods of making pressure sensitive adhesives, for example, are disclosed in U.S. Pat. No. Re 24,906 (Ulrich).

In some embodiments, the release liner is structured, and the structure on the release liner can be used to create an inverse of the structure on an adhesive, resulting in a structured adhesive. For example, for every groove in the adhesive, the release liner has a corresponding ridge. The ridges would protrude from a liner reference plane, which is defined by the liner surface at the base of each ridge. The dimensions of each ridge correspond to the desired dimensions of each groove in the adhesive. For example, the groove width at the reference plane corresponds to the ridge width at the liner reference plane. In embodiments comprising a protrusion from the reference plane or from the real walls on the adhesive structured surface, the release liner will comprise a corresponding depression. The structure on the release liner can be created in a number of known ways, including embossing the liner to form a structured surface or printing a structure on the surface.

A structured adhesive layer may be created by contacting an adhesive with the structured surface of the release liner, forming an adhesive article. The adhesive may contact the structured surface by, for example, coating a composition (e.g., an adhesive composition in solution, a composition as a dispersion or a hot melt composition) or laminating an existing adhesive layer. In embodiments where the liner was coated with a release coating, the adhesive layer exists over any release coating. The structure on the release liner imparts a structure into one major surface of the adhesive layer.

The release layer may be coated on a substrate to form the release liner. Examples include papers and polymeric films, including plastics. The liner base material may be single or multiple layer. Specific examples include, polyester (for example polyethylene terephthalate), polyethylene, polypropylene (including cast and biaxially oriented polypropylene), and papers (including clay coated paper).

Generally, a structured surface of the adhesive is opposite a backing. Stated differently, the adhesive is positioned between the release layer and the backing. The backing can be any material, depending on the intended use of the adhesive article. For example, in embodiments where the adhesive article is used for a large format graphic (e.g., over 32 inches wide), the backing may be a material suitable for receiving an image (e.g., a vinyl or a polyolefin with an ink receptor layer opposite the adhesive layer).

In the present disclosure, the adhesive article may be used in a method of adhering an adhesive to a substrate. In such an embodiment, the structured surface of the adhesive is applied to a bonding substrate. The structured surface of the adhesive layer deforms such that a major portion of the real walls of the first groove contacts the substrate while a major portion of the real walls of the second groove does not contact the substrate.

The adhesive article can be applied to a bonding substrate using additional tools, such as temperature elevation, pressure application, and aging of the adhesive to allow flow.

Exemplary Embodiments

The present disclosure provides the following representative embodiments.

1. An adhesive article comprising a pressure sensitive adhesive layer and a release layer disposed on a substrate, wherein the release layer is in contact with the pressure sensitive adhesive layer, and wherein the release layer comprises a polymer matrix comprising polymerized polyether-free (meth)acrylated silicone and a plurality of nanovoids; wherein a volume fraction of the plurality of nanovoids in the release layer is no more than 0.5.

2. The adhesive article of embodiment 1 wherein the release layer further comprises a plurality of nanoparticles.

3. The adhesive article of embodiment 2 wherein the nanoparticles comprise surface-modified nanoparticles.

4. The adhesive article of embodiment 3 wherein the surface-modified nanoparticles comprise reactive nanoparticles, non-reactive nanoparticles, or combinations thereof.

5. The adhesive article of embodiment 4 wherein the surface-modified nanoparticles comprise reactive nanoparticles.

6. The adhesive article of embodiment 5 wherein at least a portion of the reactive nanoparticles form a chemical bond with the polymer matrix.

7. The adhesive article of embodiment 4 wherein the surface-modified nanoparticles comprise non-reactive nanoparticles.

8. The adhesive article of embodiment 7 wherein at least a portion of the non-reactive nanoparticles form a physical bond with the polymer matrix.

9. The adhesive article of any one of embodiments 1 through 8 wherein the release layer is formed by a process comprising:
providing a first solution comprising a polymerizable material in a solvent, wherein the polymerizable material comprises a polyether-free (meth)acrylated silicone;
at least partially polymerizing the polymerizable material to form a composition comprising an insoluble polymer matrix and a second solution, wherein the insoluble polymer matrix comprises a plurality of nanovoids that are filled with the second solution; and
removing a major portion of the solvent from the second solution.

10. The adhesive article of embodiment 9 wherein the polymerizable material further comprises a multifunctional hydrocarbon crosslinking agent.

11. The adhesive article of embodiment 9 or embodiment 10 wherein the first solution further comprises a plurality of nanoparticles, at least some of the nanoparticles becoming bound to the insoluble polymer matrix during the polymerizing step.

12. The adhesive article of any one of embodiments 1 through 11 wherein the adhesive layer and the release layer form an interface and the interface is a structured interface.

13. The adhesive article of any one of embodiments 1 through 12 wherein the pressure sensitive adhesive comprises an acrylic adhesive.

14. The adhesive article of any one of embodiments 1 through 13 wherein the (meth)acrylated silicone is a fluorinated (meth)acrylated silicone.

15. An adhesive article comprising a pressure sensitive adhesive layer and a release layer disposed on a substrate, wherein the release layer is in contact with the pressure sensitive adhesive layer, and wherein the release layer is formed by a process comprising:
providing a first solution comprising a polymerizable material in a solvent, wherein the polymerizable material comprises a (meth)acrylated silicone;
at least partially polymerizing the polymerizable material to form a composition comprising an insoluble polymer matrix and a second solution, wherein the insoluble polymer matrix comprises a plurality of nanovoids that are filled with the second solution; and
removing a major portion of the solvent from the second solution;
wherein the release layer demonstrates a change in haze of at least 2× relative to the same composition polymerized in the absence of the solvent.

16. The adhesive article of embodiment 15 wherein the polymerizable material further comprises a multifunctional hydrocarbon crosslinking agent.

17. The adhesive article of embodiment 15 or embodiment 16 wherein the first solution further comprises a plurality of nanoparticles, at least some of the nanoparticles becoming bound to the insoluble polymer matrix during the polymerizing step.

18. The adhesive article of embodiment 17 wherein the nanoparticles comprise surface-modified nanoparticles.

19. The adhesive article of embodiment 18 wherein the surface-modified nanoparticles comprise reactive nanoparticles, non-reactive nanoparticles, or combinations thereof.

20. The adhesive article of embodiment 19 wherein the surface-modified nanoparticles comprise reactive nanoparticles.

21. The adhesive article of embodiment 20 wherein at least a portion of the reactive nanoparticles form a chemical bond with the polymer matrix.

22. The adhesive article of embodiment 19 wherein the surface-modified nanoparticles comprise non-reactive nanoparticles.

23. The adhesive article of embodiment 22 wherein at least a portion of the non-reactive nanoparticles form a physical bond with the polymer matrix.

24. The adhesive article of any one of embodiments 15 through 23 wherein the adhesive layer and the release layer form an interface and the interface is a structured interface.

25. The adhesive article of any one of embodiments 15 through 24 wherein the pressure sensitive adhesive comprises an acrylic adhesive.

26. The adhesive article of any one of embodiments 15 through 25 wherein the (meth)acrylated silicone is a fluorinated (meth)acrylated silicone.

27. A method of controlling release properties of a polymerized material, the method comprising:

providing a first solution comprising a polymerizable material in a solvent, wherein the polymerizable material comprises a (meth)acrylated silicone;

applying energy to at least partially polymerize the polymerizable material to form a composition comprising an insoluble polymer matrix and a second solution, wherein the insoluble polymer matrix comprises a plurality of nanovoids that are filled with the second solution; and removing a major portion of the solvent from the second solution to form a polymerized material having release properties;

wherein the energy of polymerization is controlled to provide the polymerized material with a desired level of release.

EXAMPLES

Objects and advantages of this disclosure are further illustrated by the following examples, but the particular materials and amounts thereof recited in these examples, as well as other conditions and details, should not be construed to unduly limit this disclosure.

Test Descriptions

180° Peel Adhesion Test

This peel test is similar to the test method described in ASTM D3330M-04. An 3.81 centimeter (1½ inch) wide adhesive tape, available from 3M, St. Paul, Minn. under trade designation "SCOTCH BOOK TAPE 845", was cut into 300 mm (12 inch) strips. Each strip was then adhered to a piece of coated film as described below using a two kilogram roller passed twice over the strip. The bonded assembly was allowed to sit at 25° C. and 50% relative humidity for seven days. A sample cutter using razor blades positioned 2.54 centimeter (1 inch) apart was used to cut a 2.54 centimeter (1 inch) wide length of the aged tape/film assembly. The assembly was tested for peel adhesion using an IMASS slip/peel tester (Model 3M90, commercially available from Instrumentors Inc., Strongville, Ohio) at a rate of 2.29 meters per minute (90 inches per minute) over a five second data collection time. Two samples if each assembly were tested; the reported peel adhesion value was an average of the peel adhesion value from each of the two samples. The peel adhesion values were measured as grams per inch and then converted to Newtons per decimeter ($N \cdot dm^{-1}$).

Water Contact Angle Test

This contact angle test is similar to the test method described in ASTM D7490-08. A 50×30 millimeter sample was cut from a section of coated film. The sample was mounted on the stage of a NRL contact angle goniometer (Model 100-00-115, available from Rame-Hart, Inc., Mountain Lakes, N.J.). A 0.03 ml drop of water (high purity solvent, available from EMD Chemicals, Gibbstown, N.J.) was carefully applied to the surface of the coated film. Two contact angles were determined, one from each side of the drop. A total of three drops were measured; the reported water contact angle was an average of the 3 drops×2 sides=6 angles that were measured.

Refractive Index

The refractive index of each of the samples was measured at 632.8 nanometer using a Metricon Model 2010 prism coupler (available from Metricon Corporation Inc., Pennington, N.J.).

Haze

Haze values disclosed herein were measured using a Haze-Gard Plus haze meter (available from BYK-Gardiner, Silver Springs, Md.) according to the procedure described in ASTM D1003.

Pore Volume Fraction

The effective refractive index of the optical film can be approximated by the following expression:

$$n_{eff} = f n_v + (1-f) n_b$$

$$f = (n_{eff} - n_b)/(n_v - n_b)$$

where f is the pore volume fraction, $n_{eff}$ is the coating refractive index, $n_v$ is the refractive index of the void (i.e., the refractive index of the air in the void; the value used was 1) and $n_b$ is the refractive index of the polymer matrix or polymer/particle matrix, which is measured from the coating polymerized conventionally (the constant value used was 1.42).

The following list of materials and their source is referred to throughout the Examples.

| Material | Description |
| --- | --- |
| NALCO 2327 | An aqueous colloidal silica dispersion obtained from Nalco Co., Naperville, IL under trade designation "NALCO 2327" |
| 1-Methoxy-2-propanol | Obtained from Aldrich Chemical Company, Milwaukee, WI |
| 3-(Trimethoxysilyl)-propyl methacrylate | Obtained from Aldrich Chemical Company, Milwaukee, WI |
| IPA | Isopropyl alcohol, obtained from Aldrich Chemical Company, Milwaukee, WI |
| TEGO RC 902 | A silicone acrylate that is a (meth)acrylate modified polydialkylsiloxane, obtained from Evonik Goldschmidt Corp., Hopewell, VA under trade designation "TEGO RC 902" |
| TEGO RC 2250 | A silicone polyether acrylate, obtained from Evonik Goldschmidt Corp., Hopewell, VA under trade designation "TEGO RC 2250" |
| TEGO RC 2300 | A silicone polyether acrylate, obtained from Evonik Goldschmidt Corp., Hopewell, VA under trade designation "TEGO RC 2300" |
| IRGACURE 819 | A photoinitiator, obtained from Ciba Specialty Chemicals, Tarrytown, NY under trade designation "IRGACURE 819" |
| SR 444 | Pentaerythritol triacrylate, obtained from Sartomer Company, Exton, PA under trade designation "SR 444" |
| HOSTAPHAN 3SAB | Polyester film, 2 mil (50 micrometer thick, obtained from Mitsubishi Polyester Film, Inc. Greer, SC under trade designation "HOSTAPHAN 3SAB" |

EXAMPLES

Preparative Example 1

Preparation of Acrylate Functionalized Silica Particles

A two liter flask was charged with 400.0 grams of NALCO 2327 and stirring was started. Then 450.0 grams of 1-methoxy-2-propanol were added. In a separate container, 25.3 grams of 3-(trimethoxysilyl)propyl methacrylate was mixed with 60.7 grams of 1-methoxy-2-propanol. This pre-mix solution was added to the flask, rinsing with 60.7 grams of 1-methoxy-2-propanol. The mixture was heated to 80° C. and stirred for 16 hours. The mixture was cooled to room temperature. Water and 1-methoxy-2-propanol were removed by distillation under reduced pressure of 4.0-4.7 kPa (30-35 Torr) at 35-40° C. An additional 900.0 grams of 1-methoxy-2-propanol was added to the reaction flask part way through the distillation to replace water and 1-methoxy-2-propanol lost from distillation. The mixture was tested for % solids by drying a small sample in a tared aluminum pan for 60 minutes in a 120° C. oven. The mixture was found to be 49.1% solids. The mixture was collected by filtering through cheesecloth to remove particulate debris. A total of 378.8 grams of product solution (i.e., acrylated silica particles in 1-methoxy-2-propanol) was obtained.

Example 1

Preparation of Coating Formulation Containing 100 wt-% TEGO RC 902

A solvent premix was prepared by combining 200 grams of IPA and 100 grams of 1-methoxy-2-propanol in a container. In a separate flask, 40 grams of TEGO RC 902 and 0.8 grams of IRGACURE 819 (2% by weight of solids) were added to 60 grams of the solvent premix.

Comparative Example A

Preparation of Coating Formulation Using TEGO RC 2250

The same procedure described in Example 1 was followed except that 40 grams of TEGO 2250 was used instead of TEGO RC 902.

Comparative Example B

Preparation of Coating Formulation Using TEGO RC 2300

The same procedure described in Example 1 was followed except that 40 grams of TEGO 2300 was used instead of TEGO RC 902.

Example 2

Preparation of Coating Formulation Containing 75 wt-% TEGO RC 902 and 25 wt-% Acrylated Silica Particles A sample of 75.0 grams TEGO RC 902 was placed in a 500-milliliter bottle. To this was added 166.7 grams IPA followed by 57.4 grams 1-methoxy-2-propanol. The mixture was stirred at room temperature to thoroughly mix the components. To this solution was added 50.9 grams of the acrylate silica nanoparticle obtained in Preparative Example 1 followed by 0.5 gram IRGACURE 819. The mixture was stirred to mix the components. This resulted in a 40 wt-% solids dispersion of TEGO RC 902 and acrylated silica particles in a 2:1 mixture of IPA and 1-methoxy-2-propanol. The ratio of silicone acrylate to functionalized nanoparticles was 75:25.

Example 3

Preparation of Coating Formulation Containing 50 wt-% TEGO RC 902 and 50 wt-% Acrylated Silica Particles A sample of 50.0 grams TEGO RC 902 was placed in a 500-milliliter bottle. To this was added 166.7 grams IPA followed by 31.5 grams 1-methoxy-2-propanol. The mixture was stirred at room temperature to thoroughly mix the components. To this solution was added 101.8 grams of the acrylate silica nanoparticle obtained in Preparative Example 1 followed by 0.5 gram IRGACURE 819. The mixture was stirred to mix the components. This resulted in a 40 wt-% solids dispersion of TEGO RC 902 and acrylated silica particles in a 2:1 mixture of IPA and 1-methoxy-2-propanol. The ratio of silicone acrylate to functionalized nanoparticles was 50:50.

Example 4

Preparation of Coating Formulation Containing 25 wt-% TEGO RC 902 and 75 wt-% Acrylated Silica Particles A sample of 25.0 grams TEGO RC 902 was placed in a 500-milliliter bottle. To this was added 166.7 grams IPA followed by 5.6 grams 1-methoxy-2-propanol. The mixture was stirred at room temperature to thoroughly mix the components. To this solution was added 152.7 grams of the acrylate silica nanoparticle obtained in preparative example 1 followed by 0.5 gram IRGACURE 819. The mixture was stirred to mix the components. This resulted in a 40 wt-% solids dispersion of TEGO RC 902 and acrylated silica particles in a 2:1 mixture of IPA and 1-methoxy-2-propanol. The ratio of silicone acrylate to functionalized nanoparticles was 25:75.

Example 5

Preparation of Coating Formulation Containing 37.5 wt-% TEGO RC 902, 37.5 wt-% SR 444 and 25 wt-% Acrylated Silica Particles A sample of 37.5 grams TEGO RC 902 and 37.5 grams SR 444 were placed in a 500-milliliter bottle. To this was added 166.7 grams IPA followed by 57.4 grams 1-methoxy-2-propanol. The mixture was stirred at room temperature to thoroughly mix the components. To this solution was added 50.9 grams of the acrylate silica nanoparticle obtained as in Preparative Example 1 followed by 0.5 gram IRGACURE 819. The mixture was stirred to mix the components. This resulted in a 40 wt-% solids dispersion of TEGO RC 902, SR 444 and acrylated silica particles in a 2:1 mixture of IPA and 1-methoxy-2-propanol. The ratio of total acrylate to functionalized nanoparticles was 75:25.

Example 6

Preparation of Coating Formulation Containing 25 wt-% TEGO RC 902, 25 wt-% SR 444 and 50 wt-% Acrylated Silica Particles A sample of 25.0 grams TEGO RC 902 and 25.0 grams SR 444 were placed in a 500-milliliter bottle. To this was added 166.7 grams IPA followed by 31.5 grams 1-methoxy-2-propanol. The mixture was stirred at room temperature to thoroughly mix the components. To this solution was added 101.8 grams of the acrylate silica nanoparticle obtained as in Preparative Example 1 followed by 0.5 gram IRGACURE 819. The mixture was stirred to mix the components. This resulted in a 40 wt-% solids dispersion of TEGO RC 902, SR 444 and acrylated silica particles in a 2:1 mixture of IPA and 1-methoxy-2-propanol. The ratio of total acrylate to functionalized nanoparticles was 50:50.

Example 7

Preparation of Coating Formulation Containing 12.5 wt-% TEGO RC 902, 12.5 wt-% SR 444 and 75 wt-% Acrylated Silica Particles A sample of 12.5 grams TEGO RC 902 and 12.5 grams SR 444 were placed in a 500-milliliter bottle. To this was added 166.7 grams IPA followed by 5.6 grams 1-methoxy-2-propanol. The mixture was stirred at room temperature to thoroughly mix the components. To this solution was added 152.8 grams of the acrylate silica nanoparticle obtained as in Preparative Example 1 followed by 0.5 gram IRGACURE 819. The mixture was stirred to mix the components. This resulted in a 40 wt-% solids dispersion of TEGO RC 902, SR 444 and acrylated silica particles in a 2:1 mixture of IPA and 1-methoxy-2-propanol. The ratio of total acrylate to functionalized nanoparticles was 25:75.

Coating Process

The coating compositions prepared above for Comparative Examples A-B and Examples 1-7 were coated on desired substrates using the general process described in WO2010/120468 (Kolb et al.) under section titled "Processing coating solution" of Example 1, except as follows. The coating solutions were supplied at a rate of 5 milliliters per minute to a 10.2 centimeter (4 inch) wide slot-type coating die. The rate at which the coating formulation was delivered could be varied. The polyester film substrate (HOSTAPHAN 3SAB) was moving at a speed of 305 centimeter per minute (10 feet per minute), resulting in a wet coating thickness of approximately 15 micrometers. The 10.2 centimeter (4 inch) wide coating die was inside a clamshell enclosure (i.e., shroud). After coating, the web passed through the shroud to reduce evaporation of the solvent before entering the UV LED polymerization section. The UV LED radiation source array had 8 LEDs across the width of the web and 20 rows of LEDs down the length of the web in a 10.2 centimeter (4 inch) by 20.4 centimeter (8 inch) area. The LEDs were 385 nanometers UV LEDs (available from Cree Inc., Durham, N.C.). The UV LED array was spaced approximately 2.54 centimeter (1 inch) from the substrate with the 10.2 centimeter (4 inch) dimension positioned in the downweb direction. The fan-cooled array was powered by a TENMA 72-6910 (42V/10A) power supply (available from TENMA, Centerville Ohio). The power supply output was controlled from 0 to 9 Amperes. The UV LED polymerization section was supplied with 46.7 liters per minute (100 cubic feet per hour) of nitrogen from a downstream gas introduction device which resulted in approximately 150 ppm oxygen concentration in the controlled environment. Following UV LED polymerization, the coated web travelled a 3 meters (10 feet) span in the room environment, and then passed through two 1.5 meter (5 feet) long zones of small gap drying with plate temperatures set at 77° C. (170° F.). The coating was then post-polymerized using a Fusion Systems Model 1300P UV cure system (available from Fusion UV Systems, Inc., Gaithersburg Md.) fitted with an H-bulb. The UV chamber was nitrogen-inerted to approximately 50 ppm oxygen.

Example 8 and Comparative Example C

Example 8 and Comparative Example C show that the coating compositions and the process of this invention can be used to create controlled release coatings with varying degrees of peel force.

Example 8A-D and Comparative Example C1-C6 were prepared by coating the indicated coating compositions according to the coating process described above. The energy input through the UV curing system was varied. Table 1 below summarizes the coating compositions and process conditions used as well as the properties of resulting coating.

TABLE 1

| Example | Coating Comp. | Pump Speed (mL/min) | UV LED Current (Amps) | Refractive Index | Haze | Peel Force (mN/dm) | Void Fraction (f) |
|---|---|---|---|---|---|---|---|
| 8A | Ex. 1 | 6 | 0 (off) | 1.410 | 3.09 | 165.9 | 0 |
| 8B | Ex. 1 | 6 | 3 | 1.418 | 58.7 | 1049.4 | 0 |
| 8C | Ex. 1 | 6 | 6 | 1.325 | 36.65 | 1736.2 | 0.21 |
| 8D | Ex. 1 | 6 | 9 | 1.331 | 37.7 | 1485.4 | 0.19 |
| Comp C1 | Comp. A | 5 | 0 (off) | 1.446 | 2.65 | ND | 0 |
| Comp C2 | Comp A | 5 | 6 | 1.447 | 2.80 | ND | 0 |
| Comp C3 | Comp. A | 5 | 15 | 1.446 | 2.90 | ND | 0 |
| Comp C4 | Comp. B | 5 | 0 (off) | 1.447 | 2.52 | ND | 0 |
| Comp C5 | Comp. B | 5 | 9 | 1.446 | 2.51 | ND | 0 |
| Comp C6 | Comp. B | 5 | 15 | 1.446 | 2.70 | ND | 0 |

Data presented in Table 1 above show that the effective refractive index (as measured by the Metricon Model 2010 prism coupler) and haze (a measure of surface roughness) can be modified while maintaining good adhesive release performance. While not presented in Table 1, the contact angle of coatings of Example 8 increased from 108° (for Example 8A) to 114° (for Example 8D) and the coating became more hydrophobic as the current was increased.

The refractive index and haze value of Comparative Example C samples did not change with variation of current from 0 to 15 amps. This data suggest that the coatings of Comparative Example C did not have a porous structure.

Example 9

Example 9 shows that the coating compositions and the process of this invention can be used to create controlled release coatings with varying degrees of peel force, haze, refractive index, and water contact angle.

Examples 9A-Y were prepared by coating the indicated coating compositions according to the coating process described above. The coating solutions were supplied (i.e., pump rate) at a rate of 5 milliliters per minute. The energy input through the UV curing system was varied from zero to 9 Amperes as indicated. Table 2 below summarizes the coating compositions and process conditions used as well as the properties of resulting coating.

TABLE 2

Comparison of silicone acrylates containing various levels of acrylated silica nanoparticles showing the effect on haze (surface roughness and/or porosity) while maintaining good adhesive release values.

| Example | Wt-% TEGO RC 902 | Wt-% methacrylated silica, Preparative Example 1 | Pump Speed (cm³/min) | UV LED current (amps) | Haze | Peel Force (mN/dm) |
|---|---|---|---|---|---|---|
| Example 1 | 100 | 0 | 5 | 0 (off) | 3.09 | 497.7 |
| Example 1 | 100 | 0 | 5 | 9 | 37.7 | 1485.4 |
| Example 2 | 75 | 25 | 5 | 0 (off) | 5.8 | ND |
| Example 2 | 75 | 25 | 5 | 9 | 25.8 | 455.3 |
| Example 3 | 50 | 50 | 5 | 0 (off) | 0.5 | 409.0 |
| Example 3 | 50 | 50 | 5 | 9 | 11.5 | 297.1 |
| Example 4 | 25 | 75 | 5 | 0 (off) | 90.0 | ND |
| Example 4 | 25 | 75 | 5 | 9 | 55.8 | 1149.8 |

ND—not determined

Data presented in Table 2 above shows that the haze can be modified (and release performance controlled) while maintaining good adhesive release performance. Example 4 demonstrates an upper useful nanoparticle loading in a release layer.

Data presented in Table 3 above shows that the refractive index decreased (1.42 to 1.230) and haze value increased (4.3 to 43.4) with the UV LED power supply variation from 0 to 9 amps. It indicates that multifunctional hydrocarbon acrylates such as SR444 in the coating solution are compatible in providing a porous structure. This porous structure results in adjustable release properties of the coating. This example demonstrates that the process can be used to create porous coatings and control the release properties. That is, a varying the energy of polymerization can be used to provide the polymerized material with a desired level of release.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the embodiments set forth herein as follows.

The invention claimed is:

1. An adhesive article comprising a pressure sensitive adhesive layer and a release layer disposed on a substrate, wherein the release layer is in contact with the pressure sensitive adhesive layer, and wherein the release layer comprises a polymer matrix comprising polymerized polyether-free (meth)acrylated silicone and a plurality of nanovoids; wherein a volume fraction of the plurality of nanovoids in the release layer is no more than 0.5.

2. The adhesive article of claim 1 wherein the release layer further comprises a plurality of nanoparticles.

3. The adhesive article of claim 1 wherein the nanoparticles comprise surface-modified nanoparticles.

4. The adhesive article of claim 3 wherein the surface-modified nanoparticles comprise reactive nanoparticles, non-reactive nanoparticles, or combinations thereof.

5. The adhesive article of claim 4 wherein the surface-modified nanoparticles comprise reactive nanoparticles.

TABLE 3

Multifunctional hydrocarbon (meth)acrylate containing systems.

| Ex. | Wt-% TEGO RC 902 | Wt-% SR 444 | Wt-% methacrylated silica, Prep. Example 1 | Pump Speed (cm³/min) | UV LED Current (Amps) | Refractive Index | Haze | Water Contact Angle | Peel Force (mN/dm) | Void Fraction |
|---|---|---|---|---|---|---|---|---|---|---|
| 1 | 100 | 0 | 0 | 5 | 0 (off) | 1.41 | 3.09 | 108 | 497.7 | 0 |
| 1 | 100 | 0 | 0 | 5 | 3 | 1.418 | 58.7 | | 1049.4 | 0 |
| 1 | 100 | 0 | 0 | 5 | 6 | 1.325 | 36.65 | 114 | | 0.21 |
| 1 | 100 | 0 | 0 | 5 | 9 | 1.331 | 37.7 | | 1485.4 | 0.19 |
| 5 | 37.5 | 37.5 | 25 | 5 | 0 (off) | 1.425 | 4.3 | 109 | 347.2 | 0 |
| 5 | 37.5 | 37.5 | 25 | 5 | 3 | | | 114 | 1327.2 | |
| 5 | 37.5 | 37.5 | 25 | 5 | 6 | 1.23 | 43.4 | 117 | 1253.9 | 0.46 |
| 5 | 37.5 | 37.5 | 25 | 5 | 9 | | | 117 | 1512.4 | |
| 6 | 25 | 25 | 50 | 5 | 0 (off) | 1.42 | 43.5 | 112 | 424.4 | 0 |
| 6 | 25 | 25 | 50 | 5 | 3 | | | 129 | 8314.6 | |
| 6 | 25 | 25 | 50 | 5 | 6 | 1.21 | 60.5 | 126 | 5988.0 | 0.50 |
| 6 | 25 | 25 | 50 | 5 | 9 | | | 122 | 2542.6 | |
| 7 | 12.5 | 12.5 | 75 | 5 | 0 (off) | | 69.5 | 116 | 30557 | |
| 7 | 12.5 | 12.5 | 75 | 5 | 3 | | | 128 | 733.1 | |
| 7 | 12.5 | 12.5 | 75 | 5 | 6 | 1.43 | 2.8 | 131 | 455.3 | 0 |
| 7 | 12.5 | 12.5 | 75 | 5 | 9 | | | 131 | 536.3 | |

6. The adhesive article of claim 5 wherein at least a portion of the reactive nanoparticles form a chemical bond with the polymer matrix.

7. The adhesive article of claim 4 wherein the surface-modified nanoparticles comprise non-reactive nanoparticles.

8. The adhesive article of claim 7 wherein at least a portion of the non-reactive nanoparticles form a physical bond with the polymer matrix.

9. An adhesive article comprising a pressure sensitive adhesive layer and a release layer disposed on a substrate, wherein the release layer is in contact with the pressure sensitive adhesive layer, and wherein the release layer is formed by a process comprising:
providing a first solution comprising a polymerizable material in a solvent, wherein the polymerizable material comprises a (meth)acrylated silicone;
at least partially polymerizing the polymerizable material to form a composition comprising an insoluble polymer matrix and a second solution, wherein the insoluble polymer matrix comprises a plurality of nanovoids that are filled with the second solution; and
removing a major portion of the solvent from the second solution;
wherein the release layer demonstrates a change in haze of at least 2× relative to the same composition polymerized in the absence of the solvent.

10. The adhesive article of claim 9 wherein the polymerizable material further comprises a multifunctional hydrocarbon crosslinking agent.

11. The adhesive article of claim 9 wherein the first solution further comprises a plurality of nanoparticles, at least some of the nanoparticles becoming bound to the insoluble polymer matrix during the polymerizing step.

12. The adhesive article of claim 10 wherein the nanoparticles comprise surface-modified nanoparticles.

13. The adhesive article of claim 12 wherein the surface-modified nanoparticles comprise reactive nanoparticles, non-reactive nanoparticles, or combinations thereof.

14. The adhesive article of claim 13 wherein the surface-modified nanoparticles comprise reactive nanoparticles.

15. The adhesive article of claim 14 wherein at least a portion of the reactive nanoparticles form a chemical bond with the polymer matrix.

16. The adhesive article of claim 13 wherein the surface-modified nanoparticles comprise non-reactive nanoparticles.

17. The adhesive article of claim 16 wherein at least a portion of the non-reactive nanoparticles form a physical bond with the polymer matrix.

18. The adhesive article of claim 9 wherein the adhesive layer and the release layer form an interface and the interface is a structured interface.

19. The adhesive article of claim 9 wherein the pressure sensitive adhesive comprises an acrylate-based adhesive or a silicone-based adhesive.

20. The adhesive article of claim 9 wherein the (meth)acrylated silicone is a fluorinated (meth)acrylated silicone.

* * * * *